United States Patent [19]

Hoddie et al.

[11] Patent Number: 5,768,569
[45] Date of Patent: Jun. 16, 1998

[54] PROCESSING DATA FOR AN IMAGE DISPLAYED ON A COMPUTER CONTROLLED DISPLAY SYSTEM

[75] Inventors: James P. Hoddie, Mountain View; Ian D. Ritchie, Boulder Creek, both of Calif.

[73] Assignee: Apple Computer, Inc., Cupertino, Calif.

[21] Appl. No.: 822,045

[22] Filed: Mar. 24, 1997

Related U.S. Application Data

[63] Continuation of Ser. No. 437,641, May 9, 1995, abandoned.

[51] Int. Cl.[6] .................. G06T 01/00; G06F 15/00
[52] U.S. Cl. .................. 395/501; 395/131; 345/150; 345/153
[58] Field of Search .................. 395/501, 131, 395/122, 132; 345/150, 153, 152; 348/409; 358/433, 455

[56] References Cited

U.S. PATENT DOCUMENTS

| | | |
|---|---|---|
| 3,471,848 | 10/1969 | Manber. |
| 3,480,943 | 11/1969 | Manber. |
| 4,091,424 | 5/1978 | Widegren .................. 358/433 |
| 4,437,122 | 3/1984 | Walsh et al.. |
| 5,155,805 | 10/1992 | Kaasila .................. 345/150 |
| 5,231,385 | 7/1993 | Gengler et al. .................. 345/153 |
| 5,249,242 | 9/1993 | Hanson et al.. |
| 5,270,836 | 12/1993 | Kang. |
| 5,301,267 | 4/1994 | Hassett et al.. |
| 5,353,061 | 10/1994 | Rodriguez et al. .................. 348/409 |
| 5,426,514 | 6/1995 | Jefferson .................. 358/455 |
| 5,459,828 | 10/1995 | Zack et al.. |
| 5,467,134 | 11/1995 | Laney et al. .................. 348/409 |

FOREIGN PATENT DOCUMENTS

| | | |
|---|---|---|
| 0344952 | 5/1989 | European Pat. Off.. |
| 0428356 | 11/1990 | European Pat. Off.. |

OTHER PUBLICATIONS

IBM Technical Disclosure Bulletin, vol. 35, No. 1B, "Pel Position Skewing for Anti-Aliased Font Resolution Reduction", Jun. 1992, pp. 19–21.

*Primary Examiner*—Kee M. Tung
*Attorney, Agent, or Firm*—Blakely, Sokoloff, Taylor & Zafman

[57] ABSTRACT

A method of compressing data representing a plurality of pixels consecutively arranged along a line of an image to be displayed on a computer controlled display is described. The method includes the step of determining color of an initial pixel of the plurality of pixels. The value of a pixel count is then incremented. The value of the pixel count indicates the number of pixels in that color. The color of an adjacent pixel of the initial pixel is then determined. If the color of the adjacent pixel is identical to the color of the initial pixel, then the adjacent pixel is caused to be the initial pixel and the step of incrementing the value of the pixel count is performed. The method then moves to determine the color of the next pixel. If the color of the adjacent pixel is different from the color of the initial pixel, then a datum indicating the color of the initial pixel and the value of the pixel count is generated. A method of using the compressed data of the image to blend the image onto another image is also described.

36 Claims, 6 Drawing Sheets

PROCESSING DATA FOR AN IMAGE DISPLAYED ON A COMPUTER CONTROLLED DISPLAY SYSTEM

This is a continuation of application Ser. No. 08/437,641, filed May 9, 1995, now abandoned.

FIELD OF THE INVENTION

The present invention pertains to the field of digital image processing. More particularly, this invention relates to an arrangement for compressing the data for an image displayed on a computer controlled display system to minimize the memory requirement of the display system and to allow the image to be more quickly and efficiently blended with other images.

BACKGROUND OF THE INVENTION

Prior art imaging systems typically produce a final output image using two distinct steps. First, imaging data is encoded and placed into a frame buffer. In a second step, when the frame buffer is at least partially filled, this encoded data is extracted and transmitted to a marking device (e.g., a display or a printer). Traditionally, the frame buffer has contained the precise marking pattern (i.e., bitmap or pixel map) to be utilized by the marking device when producing the final output image.

For example, in a prior art bi-level imaging system with a marking device capable of either creating a mark at a given spot or leaving the spot blank, the frame buffer consists of binary memory with each bit in the memory representing a spot on the device's output medium. For imaging systems which include marking devices capable of imaging in multiple colors or gray levels, each spot to be imaged by the device is represented by a corresponding value in the frame buffer that specifies the color or luminance of that particular spot.

Disadvantages are, however, associated with such prior art image rendering techniques. One disadvantage associated is that the frame buffer typically requires a relatively large storage capacity to store the bitmap or pixel map data for the image. This is particularly so if the image also involves colors and/or gray scales. In that case, extra data or information is required to specify the color or gray scale of each spot or pixel of the image, thus increasing the memory space to store the bitmap data. The relatively large frame buffer employed to store the bitmap data typically increases the memory cost of the imaging system, which in turn increases the system cost.

Another disadvantage is that it typically takes a relatively long time to blend a gray scaled glyph image onto a multi-color graphics image. This is due to the fact that the gray scaled glyph image includes not only the completely imaged spots (i.e., black pixels) and completely unimaged spots (i.e., white pixels), but also partially imaged spots (i.e., gray pixels) measured in different scales or levels. When a gray pixel is to be blended onto a color pixel, the color of the blended pixel needs to be changed, depending on the scale of the gray pixel and the color of the color pixel. Thus, in order to blend a glyph image onto a colored graphics image, each pixel of the glyph image is individually blended with its corresponding pixel of the graphics image. This typically takes a relatively long time to complete. In addition, it is also relatively costly to make the determination for each pixel if blending is necessary.

SUMMARY OF THE INVENTION

One of the features of the present invention is to minimize memory required for storing data for displaying an image on a computer controlled display system.

Another feature of the present invention is to compress the data for displaying an image on a computer controlled display system such that the memory associated with storing the data can be minimized.

Another feature of the present invention is to store the data for displaying a gray scaled glyph on a computer controlled display system in a compressed format such that the glyph can be blended with graphics on the display system relatively quickly and efficiently.

A method of compressing data representing a plurality of pixels consecutively arranged along a line of an image to be displayed on a computer controlled display is described. The method includes the step of determining the color of an initial pixel of the plurality of pixels. The value of a pixel count is then incremented. The value of the pixel count indicates the number of pixels in that color. The color of an adjacent pixel of the initial pixel is then determined. If the color of the adjacent pixel is identical to the color of the initial pixel, then the adjacent pixel is caused to be the initial pixel and the step of incrementing the value of the pixel count is again performed. The method then moves to determine the color of the next pixel. If the color of the adjacent pixel is different from the color of the initial pixel, then a datum indicating the color of the initial pixel and the value of the pixel count is generated.

A method of compressing data representing a plurality of pixels of an image to be displayed on a computer controlled display is described. A first pixel from the plurality of pixels is located. The color of the first pixel is then determined. A second pixel from the plurality of pixels that is adjacent to the first pixel is then located. The color of the second pixel is then determined. A datum that indicates the color of the first pixel and the number of pixels in that color is generated if the color of the second pixel is determined to be identical to the color of the first pixel.

A method of using the compressed data of a first image (e.g., gray scaled glyph image) to blend the first image onto a second image (e.g., multi-color graphics image) is also described. A datum of the first image is retrieved. The datum specifies a color and the number of consecutive pixels in that color. Then a single blending operation is performed to blend the number of pixels of the first image onto a corresponding number of pixels of the second image if the color of the number of pixels of the first image either supersedes or is superseded by the color of the corresponding pixels of the second image.

In other words, if the color in the datum is either the forecolor (typically black) or backcolor (typically white), no blending of the second image is required. This allows a maximized performance gain. When color information in the datum of the first image is a value between the forecolor and backcolor, blending is required. When this occurs, the blending value (i.e., how much and of what value) is calculated from the first datum and the color information of the corresponding pixels of the second image. The operation is as follows. In cases where each pixel in the second image is different in color, the weighted blend of the first image pixels and the second image pixels must be calculated. In cases where the second image pixels are of the same color, no re-check and re-calculation is needed for the length of the corresponding pixels specified by the datum.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
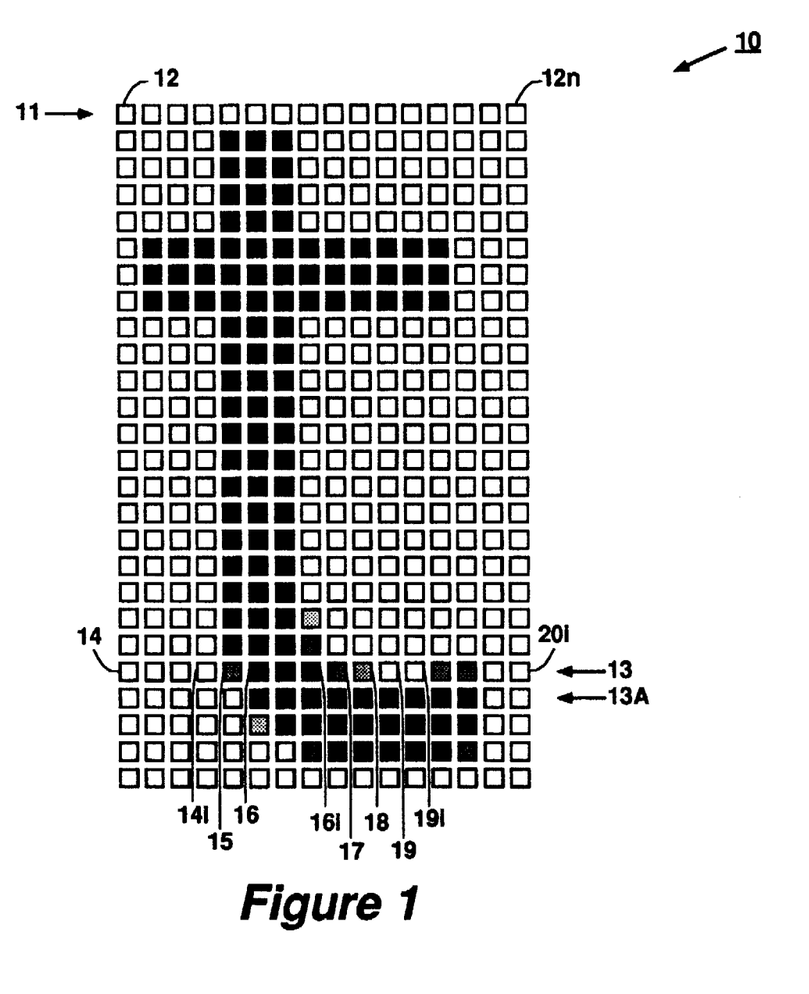
FIG. 1 shows the pixel map of a glyph "t" displayed on a computer controlled display system.

FIG. 1 shows the pixel map 10 of a glyph "t" to be displayed on a computer controlled display system. As is known, a pixel map is described as a two dimensional array of points having known coordinates which map to a display or a printer. As is known, the appearance of a pixel (i.e., spot) on a display is controlled by the signals applied to that pixel. The signals are derived from the data for that pixel stored in a pixel map memory. Pixel map 10 of glyph "t" can be blended (i.e., superimposed) onto a pixel map of a multi-color graphics image. In FIG. 1, pixel map 10 only shows one glyph "t" for illustration purposes. In practice, pixel map 10 may show a text that includes a string of glyph symbols.

As can be seen from FIG. 1, pixel map 10 is a gray scaled pixel map and includes a number of raster scan lines, each having a number of pixels. For example, scan line 11 includes a number of pixels 12 through 12n. Pixels 12–12n are white pixels (i.e., unimaged pixels on an imaging device, which are also referred to as backcolor pixels). Other scan lines of pixel image 10 may include white and black pixels (the black pixels are the imaged pixels on the imaging device, which are also referred to as the forecolor pixels). In addition, some other scan lines of pixel map 10 include gray scaled pixels (i.e., partially imaged pixels). For example, scan line 13 includes gray scaled pixels 15, 17, and 18. Each of gray scaled pixels 15, 17, and 18 has a different gray scale or level.

For one embodiment, there are fourteen gray levels or scales from white (i.e., backcolor) to black (i.e., forecolor) (i.e., total sixteen levels). For other embodiments, the gray levels can be more or fewer than sixteen. For example, the intensity of the gray color can be specified in thirty-two scales or levels from black to white.

For another embodiment, pixel map 10 may specify a multi-color graphics image. In this case, the gray levels can be used to specify the different colors.

As can be seen from FIG. 1, each pixel of pixel map 10 requires a data to specify its gray scale or color in order to describe pixel map 10. If pixel map 10 describes a colored graphics image, the actual color (instead of gray scale) of each pixel of pixel map 10 needs to be specified by the pixel data.

As described below and in accordance with one embodiment of the present invention, the pixel data of pixel map 10 is compressed in a computer controlled display system such that when pixel map 10 is blended onto another image, the compressed data allows pixel map 10 to be relatively quickly and efficiently blended onto the other image. Briefly, the compressing process determines the color (or gray scale) of an initial pixel and then determines if the adjacent pixel of the initial pixel shares the same color (or gray scale). If so, the process increments its pixel count to indicate the number of pixels in that color. The process then moves to determine the color of the next adjacent pixel and increments the pixel count unless the pixel has a different color or gray level. When this occurs, a data is generated to specify the color (or gray scale) and the number of consecutive pixels in that color. The data has two parts, one for specifying the color and the other for specifying the number of pixels. The process then repeats those steps to generate the next compressed data until the entire pixel map has been compressed. By doing so, when the compressed data of a pixel map is used to blend the pixel map onto another pixel map, the blending can be done in a relatively quick and efficient manner. This means to blend a number of pixels at one time if these pixels share the same color. In addition, the storage space required to store the compressed pixel map data is also minimized. The compressing and blending processes according to one embodiment of the present invention will be described in more detail below, in conjunction with FIGS. 2–6.

Figure 2:
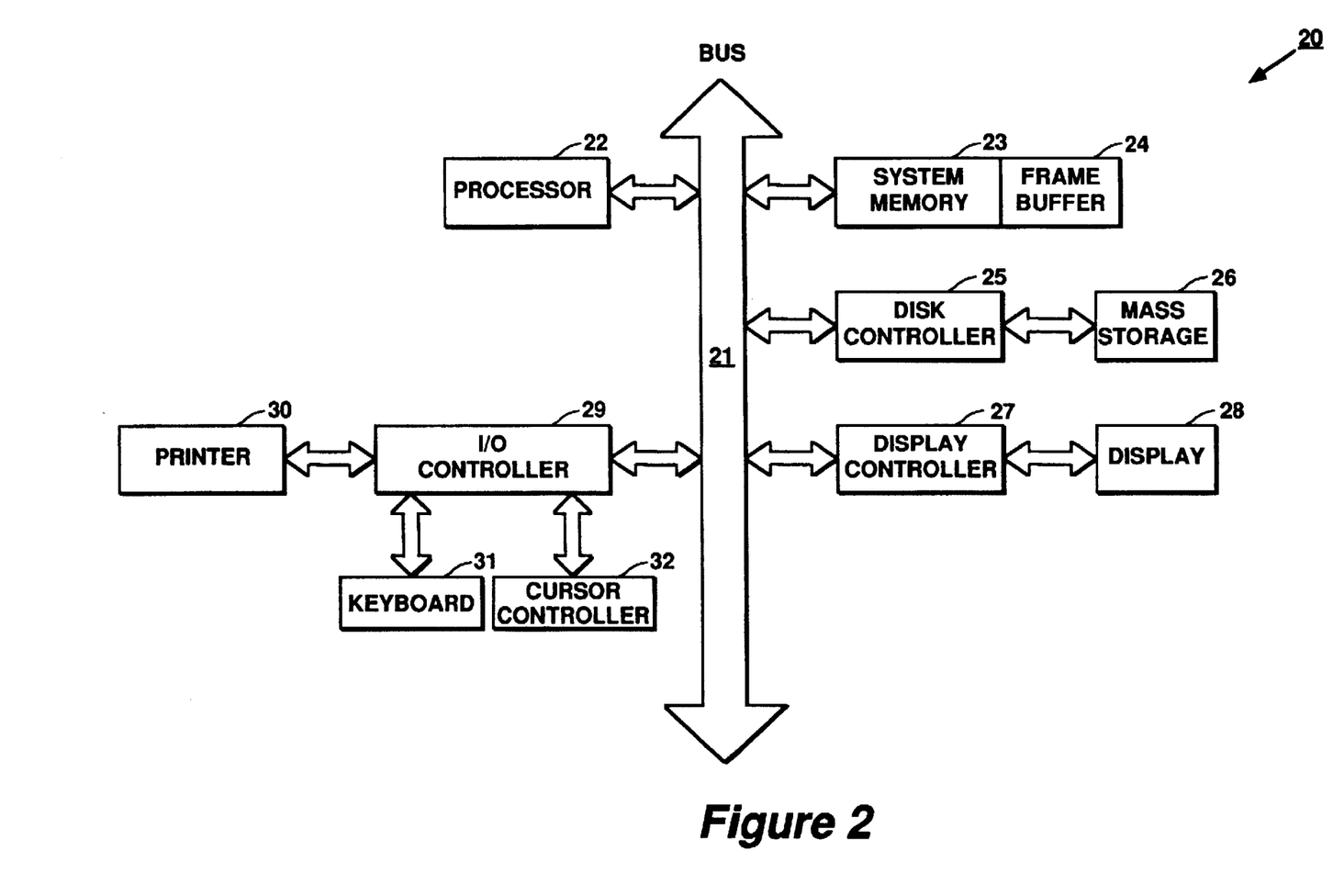
FIG. 2 shows the computer controlled display system, wherein the display system employs the function of compressing the pixel map data for a text image and using the compressed data to blend the text image onto a colored graphics image in accordance with one embodiment of the present invention.

FIG. 2 shows a computer based system 20 having a computer controlled display system for compressing data of a computer image and for blending the image using the compressed data onto other images according to one embodiment of the present invention. For one embodiment, computer system 20 of FIG. 2 operates in a multimedia environment and supports integrated digital media and three-dimensional graphics and models. For one embodiment, computer system 20 is a personal computer. For other embodiments, computer system 20 can be a notebook computer, a laptop computer, a minicomputer, a workstation computer, a mainframe computer, or any other type of computer system.

Computer system 20 includes a processor 22 which is often a microprocessor such as the commercially available 68030 or 68040 microprocessor from Motorola. Computer system 20 also includes a system bus 21 and system memory 23 for storage of instructions and data for use by processor 22. System bus 21 typically includes address and data lines as well as control lines for allowing communication of data and instructions between various components of computer system 20 such as processor 22 and system memory 23 as well as other components shown in FIG. 2. Computer system 20 also includes a frame buffer 24 for storing pixel data or information for display on a display 28 or to be printed by printer.

Computer system 20 also includes a mass storage device 26, such as a hard disk, and a disk controller 25 which is typically coupled to system bus 21. Computer system 20 further includes a display controller 27 for controlling and processing image data to be imaged on display 28. As described above, the image data is stored in frame buffer 24 before being displayed on display 28. Input and output of computer system 20 is also provided by an input/output controller 29 which may be one unit or several different units as is known in the art for controlling the input and output from/to printers such as printer 30, keyboards such as keyboard 31, and cursor control devices such as cursor controller 32. Processor 22 retrieves programs containing instructions and data from mass storage device 26 and causes these instructions and data to be loaded into system memory 23 for execution of the instructions. Processor 22 executes the instructions and causes a displayable representation, such as a pixel map to be created in frame buffer 24, which representation is then conveyed over system bus 21 to display controller 27 or I/O controller 29 so that the displayable representation, such as a pixel map, may then be displayed on display 28 or printed by printer 30. As is well known, display 28 may be any variety of suitable computer controlled display devices, such as CRT displays or liquid crystal displays, etc. As is also well known, printer 30 may be one or more of any variety of "hard copy" display devices such as laser printers, ink jet printers, etc. It is well known that numerous other computer architectures exist, and the present invention may be practiced in those architectures as well.

Figure 3:
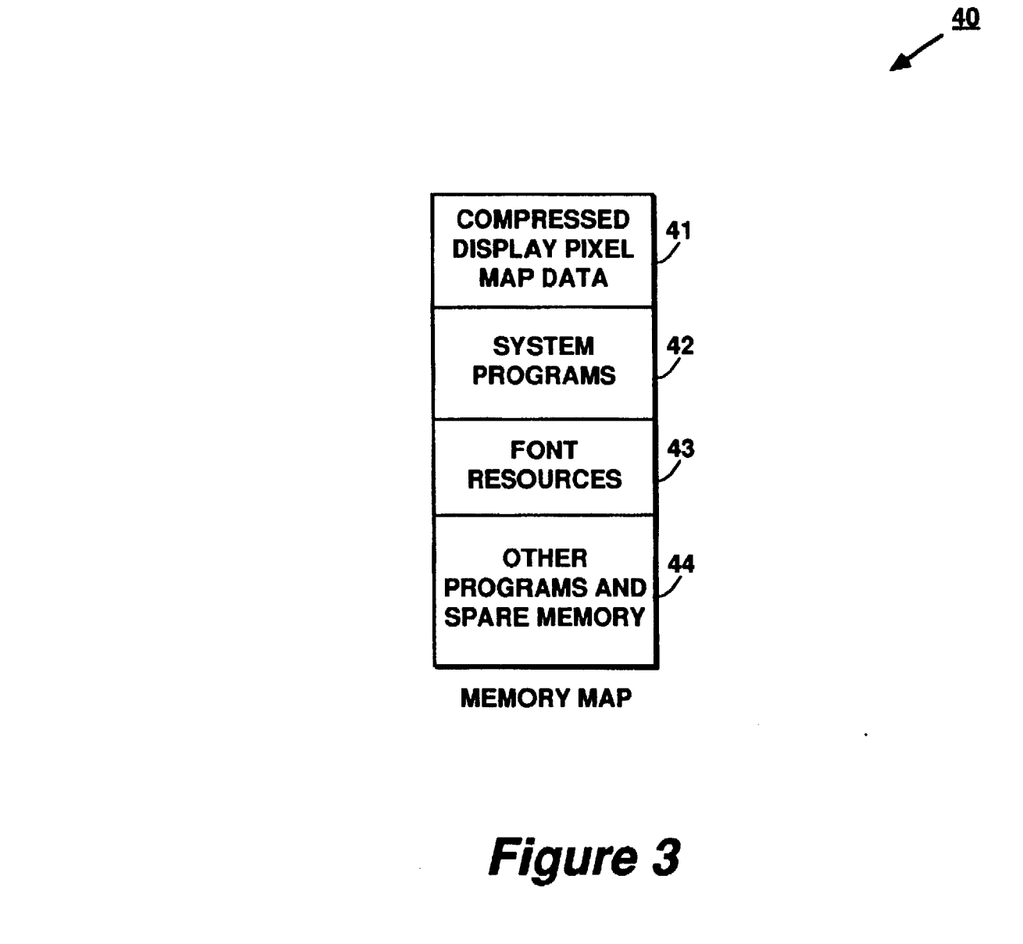
FIG. 3 shows the memory map of the system memory and frame buffer of the display system of FIG. 2.

FIG. 3 shows the memory map 40 of system memory 23 and frame buffer 24 of FIG. 2. FIG. 3 shows a typical arrangement of the major programs contained within system memory 23 and frame buffer 24 illustrated in FIG. 2. In particular, there is shown a display pixel map section 41. Pixel map section 41 represents the pixel map data stored in frame buffer 24. Each pixel data in a pixel map defines a particular pixel on an output imaging device (e.g., display 28 or printer 30).

In accordance with one embodiment of the present invention, the pixel map data stored in frame buffer 24 is in a compressed format. The pixel map data can represent a gray scaled text image, a multi-color graphics image, or a blended image of gray scaled text and multi-color graphics. The compression of the pixel map data in accordance with one embodiment will be described in more detail below, in conjunction with FIGS. 4–5. The blending of two images (i.e., a text image and a graphics image) using the compressed pixel map data in accordance with one embodiment of the present invention is also described in more detail below, in connection with FIGS. 4 and 6.

Figure 4:
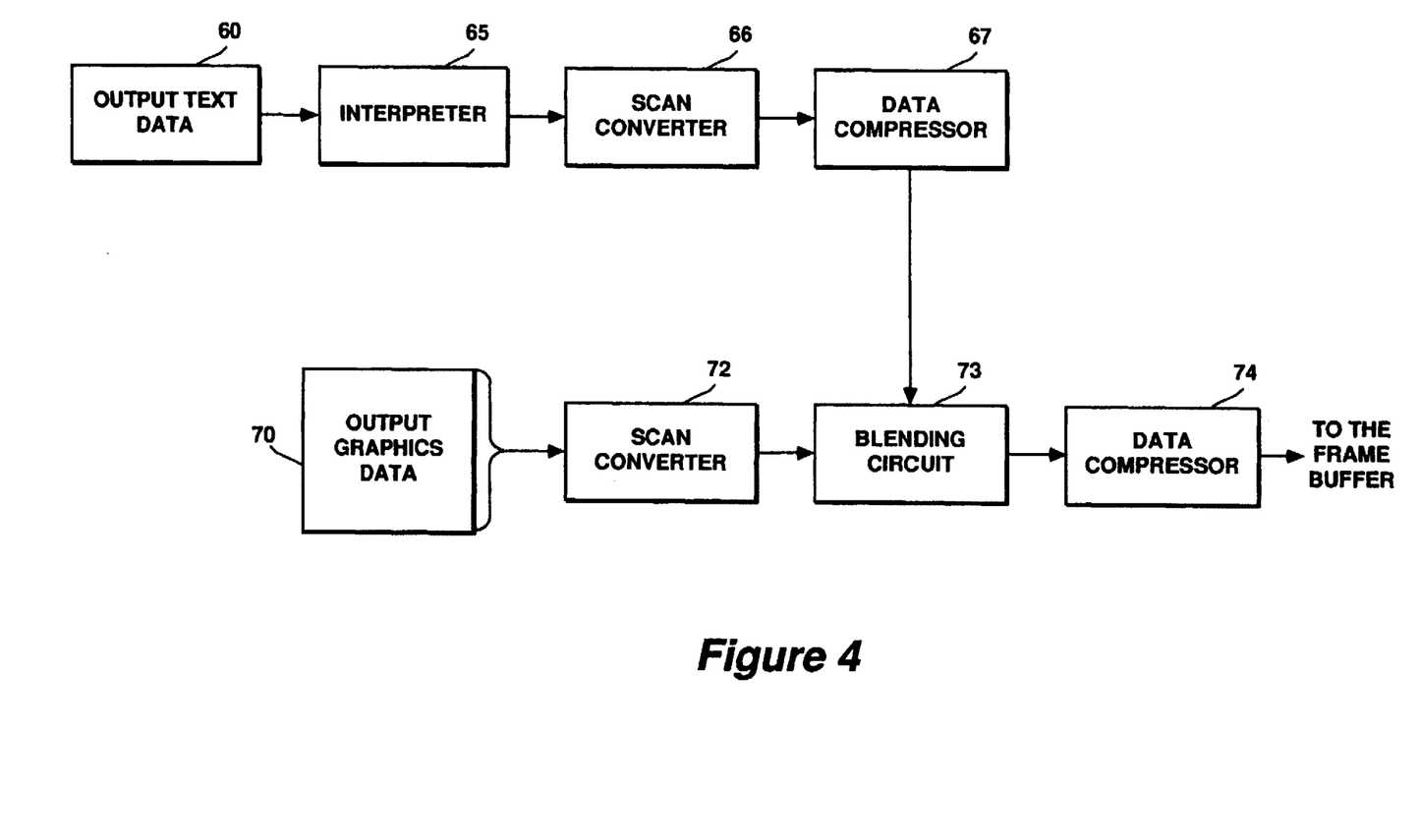
FIG. 4 illustrates a flow chart of the process of generating a compressed and blended pixel map data through a data compressor and a blending circuit of the display system of FIG. 2.

Memory map 40 of system memory 23 and frame buffer 24 also includes system program section 42 for storing system programs which represent a variety of sequences of instructions for execution by the CPU or processor 22 in order to support system level input and output and control. For example, the system programs such as disk operating systems and the like may be stored within section 42. Typically also, the programs which provide scan conversion such as scan converters 66 and 72 of FIG. 4 may also be stored in section 42. Moreover, the programs which provide data compression and image blending using the compressed pixel map data in accordance with one embodiment of the present invention may also be stored in section 42. The data compression programs in accordance with one embodiment of the present invention are shown in FIG. 4 as data compressors 67 and 74. The image blending programs in accordance with one embodiment of the present invention are shown in FIG. 4 as blending circuit 73. These programs will be described in more detail below, in conjunction with FIGS. 4–6.

System memory 23 typically also includes font resources shown within memory section 43, which font resources include outline font data. Additionally, space within system memory 23 is also reserved for other programs and spare memory as shown as memory section 44 in FIG. 3. These other programs may include a variety of useful computational or utility programs as may be desired. In addition, graphics data for generating graphics image data may also be stored in section 44 of memory map 40.

FIG. 4 is the flow chart that shows the process of compressing the scan converted pixel map data of a text image and the process of blending two display images (e.g., a text image and a graphics image) using the compressed pixel map data. As can be seen from FIG. 4, output text data 60 specifies a text to be imaged on an output imaging device (e.g., display 28 or printer 30). The output text data 60 typically includes text data for specifying or identifying the alphanumeric or other characters or symbols to be printed or displayed. In addition, output text data 60 also includes other control information which will be described below. Output text data 60 can be generated by any known text-rendering techniques adopted in computer system 20 of FIG. 2. Output text data 60 typically includes at least one glyph for imaging. Alternatively, text data 60 can include graphics data for imaging graphics, or a combination of text and graphics data.

Output text data 60 also includes other control information for defining font and shape in which the text is to be rendered, for defining the size of the glyph, and for defining coordinates of characters relative to a page or display screen or relative to each other. All the information of output text data 60 passes through an interpreter 65 to generate the actual text image data. Interpreter 65 can be implemented by any known text image rendering software programs. The text image data is then applied to scan converter 66 for scan converting the text data into gray scaled pixel map data. As described above, scan converter 66 can be implemented by any known scan conversion software or hardware means. The scan converted pixel map data specifies the actual pixel map (e.g., the pixel map shown in FIG. 1) to be imaged on an actual output imaging device. Each pixel data of the pixel map data specifies the gray scale (including black and white) of the pixel to be actually imaged. The converted pixel map data then passes through a data compressor 67 for data compression. Moreover, the above-described procedures for rendering the pixel map data can be done in one step.

Referring back to FIG. 1, the data compressing function of compressor 67 of FIG. 4 can be explained as follows. When, for example, the pixel data of scan line 13 is to be compressed, pixel 14 is first located and its gray scale (or color) is determined. In this case, pixel 14 is determined to be a white (i.e., backcolor) pixel. Then the gray scale (or color) of its adjacent pixels is determined and the pixel count indicating the number of pixels in that gray scale (or color) is accordingly incremented. The pixel count is initially set at zero. When pixel 15 is reached and its gray scale is determined not to be white, a first data is generated. The first data has two parts, one for defining the gray scale (in this case, white) and the other for defining the value of the pixel count (in this case, three). Here, the value three in the pixel count indicates four pixels. The pixel count is then reset zero.

For one embodiment, each part of the data is four bits wide. Alternatively, the two parts of the data can be longer or shorter than four bits.

Then pixel 16 is located and its color is determined. Because pixel 16 is a black (i.e., forecolor) pixel, a second data is generated that indicates the gray level of pixel 15 and the value of pixel count (in this case, zero). The pixel count is then reset. The process of compressing then moves to check the gray scale of the next pixel of pixel 16 and increment the value of pixel count accordingly until pixel 16i. When pixel 17 is reached, a third data is generated. The color part of the third data specifies the black color and the pixel count part of the third data indicates a value of two. The compression process is then repeated until pixel 20i is checked. This data compression function of compressor 67 will be described in more detail below, in conjunction with FIG. 5.

The compressed pixel map data from data compressor 67 is then applied to a blending circuit 73 if the text image is intended to be blended onto another image (e.g., a graphics image). If not, the compressed pixel map data from data compressor 67 can be directly applied to frame buffer 24 of FIG. 2.

As can also be seen from FIG. 4, an output graphics data 70 is applied to scan converter 72. The output graphics data 70 specifies a graphics image to be imaged on the output imaging device (e.g., display 28 or printer 30). Output graphics data 70 can be generated by any known graphics-rendering techniques adopted in computer system 20 of FIG. 2.

Output graphics data 70 is then scan converted to become colored pixel map data. The colored pixel map data specifies the actual pixel map of the graphics image to be imaged on the output imaging device. Each pixel data of the colored pixel map data specifies the color of the pixel to be actually imaged. The colored pixel map data from scan converter 72 is then applied to blending circuit 73 if the graphics image is intended to be blended by another image. If not, the colored pixel map data can be directly supplied to frame buffer 24 of FIG. 2. Alternatively, the colored pixel map data of graphics data 70 from scan converter 72 may pass through a data compressor such as compressor 67 before being applied to blending circuit 73.

Blending circuit 73 uses the compressed pixel map data from data compressor 67 to blend the pixel map image of text data 60 onto the pixel map image of graphics data 70. Alternatively, the graphics image that will be blended may have already been converted and stored in frame buffer 24 (FIG. 2). In this case, blending circuit 73 receives the pixel map data of the graphics image for blending from frame buffer 24, instead of scan converter 72.

The blending operation of blending circuit 73 using the compressed pixel map data is described as follows, with reference to FIG. 1. When blending circuit 73 receives the first data defining the color of pixels 14–14i, blending circuit 73 only needs to make one determination for these pixels. In this case and for pixels 14–14i, the decision is to do nothing in terms of blending these pixels. Similarly, for pixels 19–19i, the decision is to do nothing in terms of blending these pixels. When blending circuit 73 receives the third data defining the color of pixels 16–16i, blending circuit 73 again only needs to make one determination. In this case, the black color of pixels 16–16i are to be blended onto the other image. Only when the data for gray pixels such as pixel 15 is received in blending circuit 73, does blending circuit 73 need to individually blend the gray scale of the pixel with the color of the corresponding pixel of the other image. This blending operation by blending circuit 73 using compressed pixel map data will be described in more detail below, in conjunction with FIG. 6.

The output of blending circuit 73 is then applied to data compressor 74 for further data compression. For one embodiment, data compressor 74 is optional in the system. When data compressor 74 is not included, the output of blending circuit 73 is directly applied to frame buffer 24. The operation of data compressor 74 is identical to that of data compressor 67. The output of data compressor 74 is then applied to frame buffer 24. Alternatively, the output of blending circuit 73 can be directly applied to frame buffer 24.

Figure 5:
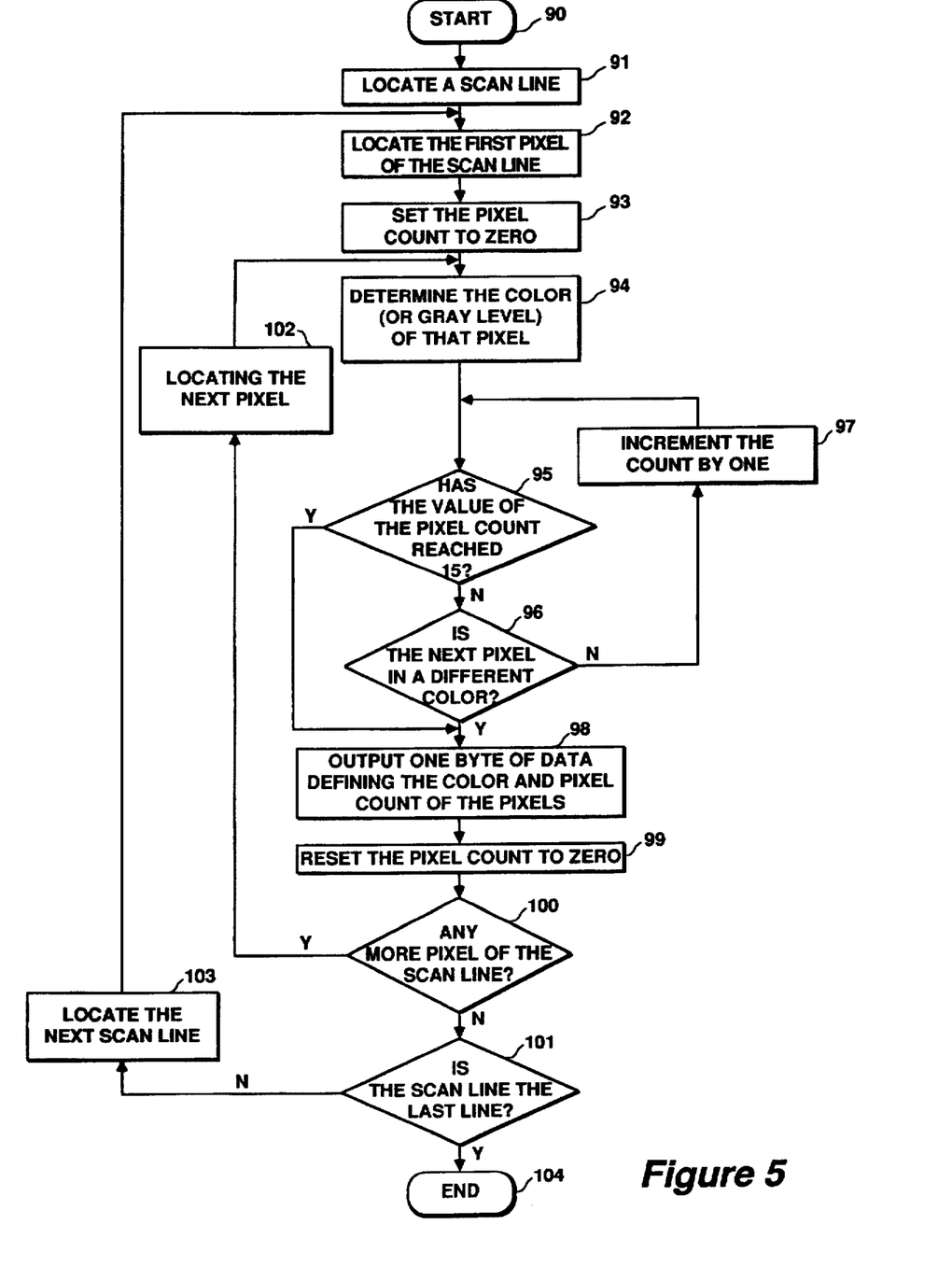
FIG. 5 is a flow chart depicting the process of the data compressor of FIG. 4 for compressing the pixel map data in accordance with one embodiment of the present invention.

The scheme of compressing the data for a pixel map image in accordance with one embodiment of the present invention is now described in conjunction with FIG. 5. The scheme of using the compressed data of the pixel map image to blend the image onto another pixel map image will be described below, in conjunction with FIG. 6.

Referring to FIG. 5, the process starts at step 90. At step 91, a scan line is located. At step 92, a first pixel of the scan line is located. At step 93, the value of the pixel count is set to zero. As described above, the pixel count is used to count or indicate the number of pixels in a particular color.

At step 94, the color (or gray level) of that pixel is determined. The process then moves to step 95, at which the value of the pixel count is compared against a predetermined number (e.g., 15). This is to make sure that the value of the pixel count does not exceed the predetermined number. Alternatively, the predetermined number can be greater or smaller than sixteen. The value of the predetermined number is determined by the bits assigned to a data for indicating the value of the pixel count.

If, at step 95, it is determined that the value has not reached the predetermined number, then step 96 is performed. Otherwise, step 96 is bypassed and step 98 is then performed.

At step 96, the color of the next pixel is determined. If the color is different from the color of the previous pixel, then step 98 is performed. If not, the process goes to step 97 to increment the pixel count.

At step 98, a byte wide data is generated that defines the color (or gray scale) and the value of the pixel count (i.e., the number of pixels counted in that color). Then step 99 is performed at which the pixel count is reset to zero. The process then moves to step 100 at which a judgment is made to find out if there are any remaining pixels along the scan line. If so, step 102 is performed. At step 102, the next pixel (i.e., the first pixel of the remaining pixels along the scan line) is located and the process then moves to step 94.

With reference to FIG. 1, if, at step 100, it is determined that there are not more pixels left along the scan line, 13, after pixel 20i has been reached then step 101 is performed at which it is determined whether the scan line is a last line of the pixel map. If not, the process moves to step 103 at which the next scan line (ie., line 13A) is located. The process then moves to step 92. If, however at step 101, it is determined that the scan line is in fact the last scan line, then the process ends at step 104.

Figure 6:
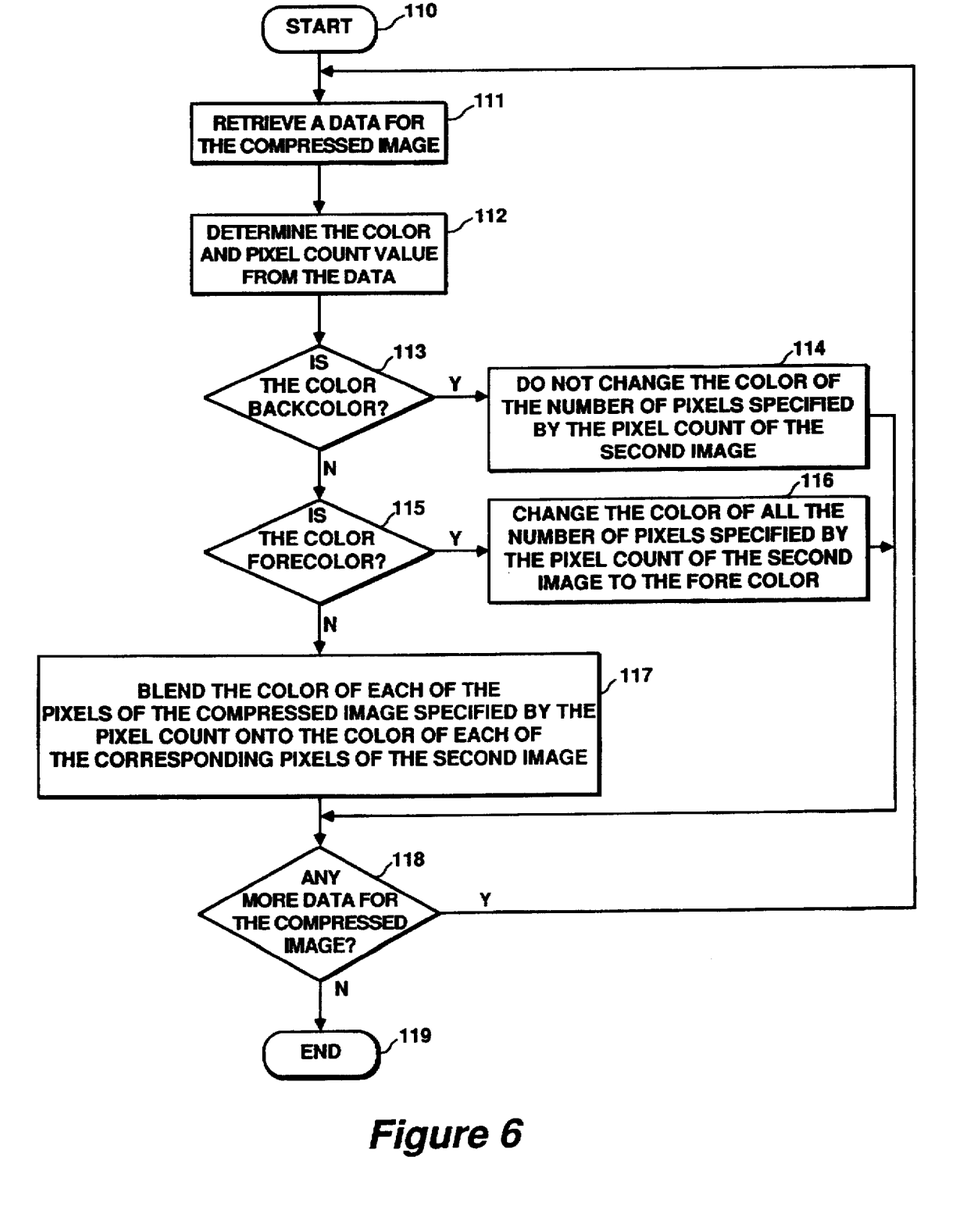
FIG. 6 shows the process of the blending circuit of FIG. 4 for using the compressed pixel map data for a text image to blend the text image onto a colored graphics image in accordance with one embodiment of the present invention.

Referring to FIG. 6, the process of blending starts at step 110. At step 111, a data for the compressed image (i.e., the pixel map data of which has been compressed) is retrieved. At step 112, the color and pixel count value of the data are identified. The process then moves to step 113 at which it is determined if the color indication of the data is white (i.e., the backcolor). If so, then step 114 is performed. At step 114, the corresponding number of pixels of the second image (i.e., the other image to be blended) will not change their colors.

If, at step 114, it is determined that the color specified by the data is not the backcolor, then step 115 is performed at which it is determined if the color specified by the data is black (i.e., the forecolor). If so, step 116 is performed at which the color of all the corresponding number of pixels of the second image is changed to black.

If, however at step 115, it is determined that the color specified by the data is not black which means the color is a scaled gray, then step 117 is performed at which the gray scale of each of the number of pixels of the compressed image is blended onto the color of its correspond pixel of the second image. The process then moves to step 118, at which it is determined if any more data for the compressed image requires blending. If so, the process moves to step 111. If not, the process ends at step 119.

The operation of step 117 can be described as follows. First, the color of the pixels of the second image specified by the pixel count is determined.

If the pixels have different color, then the blending takes place individually. If the pixels have the same color, then the blending takes place by checking and calculating the weighted blend of the first pixel of the first and second images specified by the pixel count. The weight blend is run for the length of the pixels specified by the pixel count without the need for checking and calculating the weighted blend for each pixel.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of processing data representing a plurality of pixels consecutively arranged along a line of a first image to be blended with a second image to create a third image which is to be displayed on a computer controlled display, comprising the steps of:
   (A) determining color of an initial pixel of the plurality of pixels, said plurality of pixels being contained within an image frame of said first image;
   (B) incrementing a value of a pixel count wherein the value of the pixel count indicates a number of pixels in that color;
   (C) determining color of an adjacent pixel, within said image frame, of the initial pixel from the plurality of pixels;
   (D) if the color of the adjacent pixel is identical to the color of the initial pixel, then causing the adjacent pixel to be the initial pixel and repeating the steps (B) and (C);
   (E) if the color of the adjacent pixel is different from the color of the initial pixel, then generating a datum indicating the color of the initial pixel and the value of the pixel count, said datum representing a compressed data;
   (F) blending said first image with said second image to create said third image, said blending comprising comparing the color of the initial pixel from said compressed data to a first color value and a second color value, and if said color of the initial pixel does not equal said first and second color values, blending the color of the initial pixel with a color value of at least one pixel of said second image to create a color value for at least one pixel of said third image, and wherein
   said first image is stored in a first memory, and said second image originates from a second source.

2. The method of claim 1, wherein the step (A) further comprises the step of determining gray scale of the initial pixel.

3. The method of claim 2, wherein the step (C) further comprises the step of determining the gray scale of the adjacent pixel.

4. The method of claim 1, wherein the value of the pixel count is initially set to zero, wherein the method further comprises the steps of:
   (I) comparing the value of the pixel count with a predetermined threshold value after the step (B); and
   (II) performing the step (E) if the value of the pixel count exceeds the predetermined threshold value.

5. The method of claim 1, wherein the step (E) further comprises the step of resetting the value of the pixel count to an initial value.

6. The method of claim 5, further comprising the steps of:
   (a) causing the adjacent pixel of different color to be the initial pixel of that different color after the step (E); and
   (b) repeating the steps (A) through (E) until a last pixel of the plurality of pixels has been reached.

7. The method of claim 6, further comprising the steps of:
   (i) determining if the line is a last line of the image, wherein the image displayed on a computer controlled display includes a plurality of lines, including the line, wherein each of the plurality of lines includes a plurality of pixels; and
   (ii) repeating the steps (A) through (E) if the line is not the last line of the plurality of lines.

8. The method of claim 1, wherein said first memory is a frame buffer, and said second source is a memory other than said frame buffer.

9. A method of processing data representing a plurality of pixels of a first image to be blended with a second image to create a third image which is to be displayed on a computer controlled display, comprising the steps of:
   (A) locating a first pixel from the plurality of pixels, said plurality of pixels being contained within an image frame of said first image;
   (B) determining a color of the first pixel;
   (C) locating a second pixel, within said image frame, from the plurality of pixels that is adjacent to the first pixel;
   (D) determining a color of the second pixel;
   (E) generating a first datum, representing a compressed data, that indicates the color of the first pixel and a number of pixels in that color if the color of the second pixel is determined to be identical to the color of the first pixel;
   (F) blending said first image with said second image to create said third image, said blending comprising comparing the color of the first pixel from said compressed data to a first color value and a second color value, and if said color of the first pixel does not equal said first and second color values, blending the color of the first pixel with a color value of at least one pixel of said second image to create a color value for at least one pixel of said third image, and wherein
   said first image is stored in a first memory, and said second image originates from a second source.

10. The method of claim 9, further comprising the step of generating a second datum to indicate the color and number of the first pixel if the color of the second pixel is different from that of the first pixel.

11. The method of claim 9, further comprising the steps of:
   locating a third pixel from the plurality of pixels, said third pixel being adjacent to the second pixel;
   determining a color of the third pixel; and
   modifying the first datum to indicate the color of the first pixel and the number of pixels in that color if the color of the third pixel is also determined to be identical to the color of the first pixel.

12. The method of claim 11, further comprising the step of not modifying the first datum if the color of the third pixel is different from that of the first and second pixels.

13. The method of claim 12, further comprising the steps of:

(I) comparing the number of pixels in the first datum with a predetermined value; and (II) outputting the first datum if the number of pixels in the first datum is equal to the predetermined value.

14. The method of claim 13, further comprising the steps of:

(i) locating a fourth pixel from the plurality of pixels, said fourth pixel being adjacent to the third pixel, if the color of the third pixel is identical to that of the first pixel;

(ii) determining a color of the fourth pixel; and (iii) modifying the first datum to indicate the color of the first pixel and the number of pixels in that color if the color of the fourth pixel is also determined to be identical to the color of the first pixel.

15. The method of claim 11, wherein the step (B) further comprises the step of determining gray scale of the first pixel.

16. The method of claim 15, wherein the step (D) further comprises the step of determining the gray scale of the second pixel.

17. The method of claim 16, further comprising the step of determining the gray scale of the third pixel if the third pixel is not a color pixel.

18. The method of claim 9, wherein said first memory is a frame buffer, and said second source is a memory other than said frame buffer.

19. A method of using a compressed data for a first image to blend the first image onto a second image to create a third image, comprising the steps of:

(A) retrieving a first data representing said compressed data of the first image, wherein the first data defines a first color value and a number of consecutive pixels having said first color value, said first image being contained in a first memory, and said number of consecutive pixels being contained in a single image frame of said first image; and (B) performing a blending operation to blend the number of consecutive pixels of the first image onto a corresponding number of pixels of the second image, said second image originating from a second source, said blending operation comprising comparing said first color value from said compressed data to a second color value and a third color value, and if said first color value does not equal said second and third color values, blending said first color value with a fourth color value of at least one pixel of said second image to create a fifth color value for at least one pixel of said third image.

20. The method of claim 19, further comprising the steps of:

if the first color value of the number of consecutive pixels of the first image equals the second color values then adopting the first color value of the number of pixels of the first image as a color value of corresponding pixels of the third image; and if the first color value of the number of consecutive pixels of the first image is equal to the third color value, then adopting the fourth color value as said fifth color value of said at least one pixel of said third image.

21. The method of claim 19, wherein said first memory is a frame buffer, and said second source is a memory other than said frame buffer.

22. An apparatus for processing data representing a plurality of pixels of a first image to be blended with a second image to create a third image which is to be displayed on a computer controlled display, comprising:

(A) means for determining color of an initial pixel of the plurality of pixels, said plurality of pixels being contained within an image frame of said first image;

(B) means for incrementing a value of a pixel count, wherein the value of the pixel count indicates a number of pixels in that color;

(C) means for determining color of an adjacent pixel within said image frame, of the initial pixel from the plurality of pixels;

(D) means for causing the adjacent pixel to be the initial pixel and causing the means for incrementing to increment the value of the pixel count if the color of the adjacent pixel is identical to the color of the initial pixel, wherein the means for causing also causes the means for determining color of an adjacent pixel to determine the color of the adjacent pixel whenever the value of the pixel count is incremented;

(E) means for generating a datum, representing a compressed data, indicating the color of the initial pixel and the value of the pixel count if the color of the adjacent pixel is different from the color of the initial pixel; and (F) means for blending said first image with said second image to create said third image, said means for blending comparing the color of the initial pixel from said compressed data to a first color value and a second color value, and if said color of the initial pixel does not equal said first and second color values, blending the color of the initial pixel with a color value of at least one pixel of said second image to create a color value for at least one pixel of said third image.

23. The apparatus of claim 22, wherein the value of the pixel count is initially set to zero, wherein the apparatus further comprises:

(I) means for comparing the pixel count with a predetermined threshold value whenever the pixel count is incremented; and (II) means for generating the datum and resetting the value of the pixel count to zero whenever the pixel count exceeds the predetermined threshold value.

24. The apparatus of claim 20, further comprising means for causing the adjacent pixel of different color to be the initial pixel of that different color in order for the value of the pixel count for that different color to be determined.

25. The apparatus of claim 22, further comprising frame buffer means for storing said first image, and memory means for storing said second image.

26. A computer readable storage medium for use in a digital processing system wherein the computer readable storage medium contains instructions, which when executed by the digital processing system cause the system to perform the steps of:

retrieving a first data representing a compressed data of a first image, and wherein said first data defines a first color value and a number of consecutive pixels having said first color value, said number of consecutive pixels being contained within a single image frame containing a portion of said first image; and performing a blending operation to blend the number of consecutive pixels of the first image onto a corresponding number of pixels of a second image, said second image originating from a second source, to create a third image, said blending operation comprising comparing said first color value from said compressed data to a second color value and a third color value, and if said first color value does not equal either said second color value or said third color value, blending said first color value with a fourth color value of at least one pixel of said second image to create a fifth color value for at least one pixel of said third image.

27. A method of using a compressed data representing a first image to blend said first image onto a second image to create a third image comprising the steps of:

retrieving a first data representing said compressed data of said first image, said first compressed data representing glyphs in said first image, said first data comprising a first color value of at least one pixel in said first image; and performing a blending operation to blend said first image onto at least one pixel of said second image to create said third image, said blending operation comprising comparing said first color value from said compressed data to a second color value and a third color value, and if said first color value does not equal either said second color value or said third color value, blending said first color value with a fourth color value of at least one pixel of said second image to create a fifth color value for at least one pixel of said third image.

28. The method of claim 27, wherein said first image is stored in a frame buffer and said second image is stored in a memory device.

29. The method of claim 27 wherein said second color value represents black, and said third color value represents white.

30. The method of claim 29 wherein said blending operation is performed when said first color value represents a gray-scale color.

31. A computer readable file containing data including a representation of a first image, said first image comprising a first plurality of pixels, wherein the data is generated by a method comprising the steps of:

retrieving a first data set representing a compressed data of said first image, and wherein said first data set defines a first color value and a number of consecutive pixels having said first color value, said number of consecutive pixels being contained within a single image frame containing a portion of said first image; and performing a blending operation to blend the number of consecutive pixels of the first image onto a corresponding number of pixels of a second image, said second image originating from a second source, to create a third image, said blending operation comprising comparing said first color value from said compressed data to a second color value and a third color value, and if said first color value does not equal either said second color value or said third color value, blending said first color value with a fourth color value of at least one pixel of said second image to create a fifth color value for at least one pixel of said third image.

32. A computer readable file as in claim 31, wherein said data is applied to a frame buffer to cause the display of an image on a display device, said image corresponding to said third image.

33. A computer data signal embodied in a digital data stream comprising data including a representation of a first image, said first image comprising a first plurality of pixels, wherein the computer data signal is generated by a method comprising the steps of:

retrieving a first data set representing a compressed data of said first image, and wherein said first data set defines a first color value and a number of consecutive pixels having said first color value, said number of consecutive pixels being contained within a single image frame containing a portion of said first image; and performing a blending operation to blend the number of consecutive pixels of the first image onto a corresponding number of pixels of a second image, said second image originating from a second source, to create a third image, said blending operation comprising comparing said first color value from said compressed data to a second color value and a third color value, and if said first color value does not equal either said second color value or said third color value, blending said first color value with a fourth color value of at least one pixel of said second image to create a fifth color value for at least one pixel of said third image.

34. A computer data signal as in claim 33, wherein said data stream is applied to a frame buffer to cause the display of an image on a display device, said image corresponding to said third image.

35. A method of displaying an image on a display device coupled to a processing system, said image composed of pixel map data, said method comprising the steps of:

obtaining data representing a first image compressed by a first compression operation, said first image comprising a first plurality of pixels, the first compression operation generating a first data set representing a compressed data of said first image, and wherein said first data set defines a first color value and a number of consecutive pixels having said first color value, said number of consecutive pixels being contained within a single image frame containing a portion of said first image;

performing a blending operation to blend the number of consecutive pixels of the first image onto a corresponding number of pixels of a second image, said second image originating from a second source, to create a third image, said blending operation comprising comparing said first color value from said compressed data to a second color value and a third color value, and if said first color value does not equal either said second color value or said third color value, blending said first color value with a fourth color value of at least one pixel of said second image to create a fifth color value for at least one pixel of said third image; and applying pixel data comprising said third image to a frame buffer coupled to said display device to cause the display of said image on said display device.

36. The method of claim 35 further comprising the step of generating compressed third image data representing said third image compressed by a second compression operation which provides a second data set, and wherein said step of applying pixel data comprises the step of applying said second data set to said frame buffer.

* * * * *